J. H. RHAMY.
STOVE-PIPE DAMPER.
Reissued May 30, 1876.
No. 7,148.
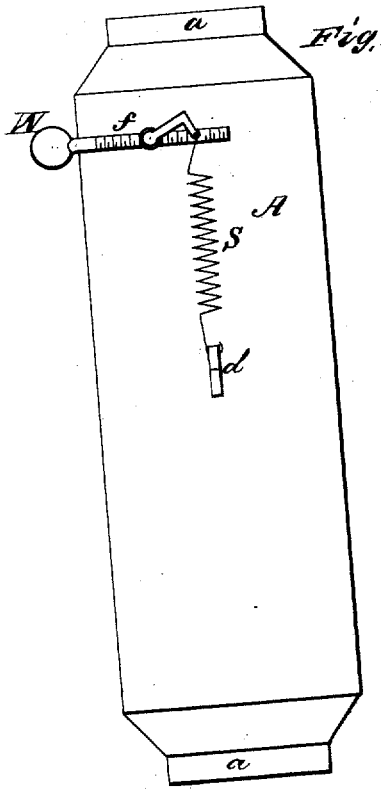
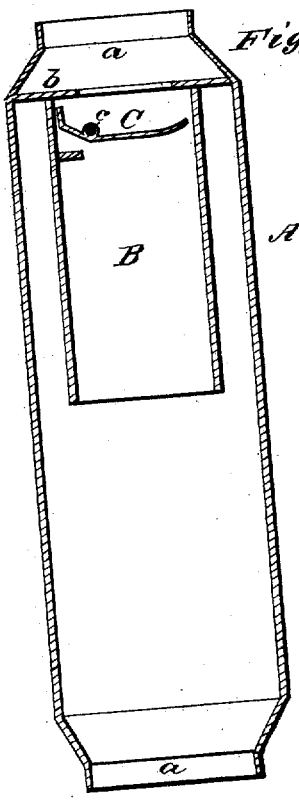
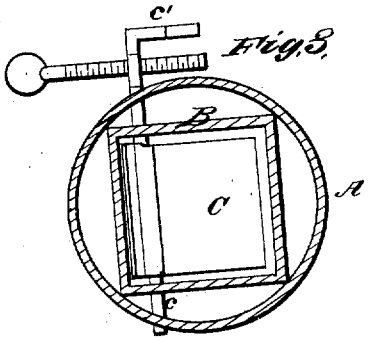
WITNESSES
W. G. Read.
E. H. Bates
By
INVENTOR
Jno. H. Rhamy.
Gilmore Smith & Co.
Attorney
N. PETERS, PHOTO-LITHOGRAPHER, WASHINGTON, D. C.

UNITED STATES PATENT OFFICE.

JOHN H. RHAMY, OF ANTIOCH, INDIANA.

IMPROVEMENT IN STOVE-PIPE DAMPERS.

Specification forming part of Letters Patent No. 175,166, dated March 21, 1876; reissue No. 7,148, dated May 30, 1876; application filed May 20, 1876.

*To all whom it may concern:*

Be it known that I, JOHN H. RHAMY, of Antioch, in the county of Huntington and State of Indiana, have invented a new and valuable Improvement in Stove-Dampers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central section of my stove-damper, and Fig. 2 is a plan view of the same. Fig. 3 is a transverse sectional view thereof.

This invention has relation to stove-dampers which are automatic in their operation; and the nature of my invention consists, mainly, in the employment, inside of a drum of larger diameter than the stove-pipe to which it is applied, of a rectangular box, inside of which is a damper, controlled by an adjustable loaded rod and a balancing-spring, as will be hereinafter explained.

In the annexed drawings, A designates a drum, which terminates in two collars, *a a*, of reduced diameter, to receive the sections of a stove-pipe. Inside of this drum is a rectangular box, B, which is secured to a ring, *b*, which is located at the upper end of the drum A, as shown in Fig. 1. The rectangular box B extends down about half-way the length of the drum, and near the upper end of this box is a curved damper, C, which is secured to a rod, *c*, that passes freely through the walls of the drum. One end of the rod *c* has an arm, *c'*, formed at right angles to it, to which the upper end of a helical spring, S, is attached. The lower end of this spring is fastened to an arm, *d*, fixed to the drum A, as shown in Fig. 1. The action of spring S is to lower and open the damper C against the upward blast. Near the arm *c'* a hole is tapped through the rod *c*, through which a screw-threaded rod, *f*, passes, carrying on one end a weight, W, which operates to partly balance the spring, and thus to facilitate the closing of the damper.

By adjusting the rod *f* endwise the damper can be nicely balanced, or the spring can be allowed to retract in a greater or less degree. Thus the damper will automatically rise or descend according to the force of the draft. At the same time heat will be retained in the box to be radiated therefrom into the room.

What I claim as new, and desire to secure by Letters Patent, is—

The drum A, at both ends terminating in the collars *a a* of reduced diameter, and provided with ring *b*, for the support of the box B, in combination with the hinged damper C, perforated rod *c*, having an arm, *c'*, spring S, and weighted adjustable screw-threaded rod, substantially as and for the purpose set forth.

In testimony that I claim the above I have hereunto subscribed my name in the presence of two witnesses.

JOHN HENRY RHAMY.

Attest:

JOHN WATKINS,
JOHN P. WATKINS.